United States Patent
Guo et al.

(10) Patent No.: US 12,278,810 B2
(45) Date of Patent: Apr. 15, 2025

(54) WIRELESS COMMUNICATION DEVICE AND WIRELESS COMMUNICATION METHOD ABLE TO VERIFY VENDOR INFORMATION

(71) Applicant: REALTEK SEMICONDUCTOR CORPORATION, Hsinchu (TW)

(72) Inventors: Ming-Zhi Guo, Suzhou (CN); Zuo-Hui Peng, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 250 days.

(21) Appl. No.: 18/095,184

(22) Filed: Jan. 10, 2023

(65) Prior Publication Data

US 2023/0224291 A1 Jul. 13, 2023

(30) Foreign Application Priority Data

Jan. 12, 2022 (CN) .......................... 202210030896.2

(51) Int. Cl.
 *G06F 15/16* (2006.01)
 *G06F 9/54* (2006.01)
 (Continued)

(52) U.S. Cl.
 CPC .......... *H04L 63/0823* (2013.01); *H04L 69/22* (2013.01); *H04W 76/15* (2018.02)

(58) Field of Classification Search
 CPC ........ H04L 69/22; H04W 76/15; H04W 12/03
 (Continued)

(56) References Cited

U.S. PATENT DOCUMENTS

2003/0217138 A1* 11/2003 Shimba ..................... H04L 9/40
 709/223
2003/0231586 A1* 12/2003 Chheda ................. H04W 28/18
 370/230

(Continued)

FOREIGN PATENT DOCUMENTS

| CN | 105246029 A | 1/2016 |
|----|-------------|--------|
| CN | 108449741 A | 8/2018 |
| CN | 111065090 A | 4/2020 |

OTHER PUBLICATIONS

1) OA letter of a counterpart TW application (appl. no. 111105757) mailed on Nov. 23, 2023. 2) Summary of the TW OA letter in regard to the TW counterpart application: 1. Paragraph [0014] of the specfication is rejected as allegedly being unclear. 2. Claims 1-10 are rejected in view of cited reference 1 (CN 111065090 A) and cited reference 2 (CN 108449741 A), in which the rejection to claim 1 is made in further view of a general reference (CN 105246029 A).

*Primary Examiner* — Hamza N Algibhah
(74) *Attorney, Agent, or Firm* — WPAT, PC

(57) ABSTRACT

A wireless communication method includes the following operations: adding a data message of a vendor of a first wireless communication device to a frame of a packet through a physical layer; transmitting, by the first wireless communication device, the packet to a second wireless communication device; analyzing, by the second wireless communication device, the packet to obtain the data message; determining, by the second wireless communication device, whether both of the vendor of the first wireless communication device and a vendor of the second wireless communication device are a predetermined vendor according to the data message; if both of the vendor of the first wireless communication device and the vendor of the second wireless communication device are the predetermined vendor, performing, by the second wireless communication (Continued)

device, a specific communication mode of the predetermined vendor to connect to the first wireless communication device.

14 Claims, 4 Drawing Sheets

(51) Int. Cl.
    *H04L 9/40*         (2022.01)
    *H04L 29/06*       (2006.01)
    *H04L 69/22*       (2022.01)
    *H04W 76/15*      (2018.01)
(58) Field of Classification Search
    USPC ......................................................... 713/156
    See application file for complete search history.

(56) References Cited

U.S. PATENT DOCUMENTS

| | | | | |
|---|---|---|---|---|
| 2004/0022225 A1* | 2/2004 | Liang | H04W 52/0238 | 370/338 |
| 2005/0025080 A1* | 2/2005 | Liu | H04L 69/323 | 370/389 |
| 2008/0181211 A1* | 7/2008 | Parolkar | H04L 41/22 | 370/389 |
| 2008/0259882 A1* | 10/2008 | Abdel-Kader | H04W 48/16 | 370/338 |
| 2009/0067358 A1* | 3/2009 | Fischer | H04L 12/1868 | 370/312 |
| 2009/0296671 A1* | 12/2009 | Beach | H04W 92/10 | 370/338 |
| 2009/0296672 A1* | 12/2009 | Beach | H04W 92/10 | 370/338 |
| 2011/0106981 A1* | 5/2011 | Watkins | G06F 13/4221 | 710/9 |
| 2012/0054400 A1* | 3/2012 | Iverson | G06F 13/385 | 710/303 |
| 2012/0134362 A1* | 5/2012 | Itagaki | H04L 1/0083 | 370/389 |
| 2013/0137393 A1* | 5/2013 | Sverdlov | H04W 76/12 | 455/406 |
| 2013/0282886 A1* | 10/2013 | Taylor | H04L 41/12 | 709/223 |
| 2014/0233855 A1* | 8/2014 | Clarke | G06F 16/583 | 707/769 |
| 2014/0274141 A1* | 9/2014 | Gholmieh | H04W 4/02 | 455/456.3 |
| 2014/0376405 A1* | 12/2014 | Erickson | H04L 12/2814 | 370/254 |
| 2014/0379817 A1* | 12/2014 | Logue | H04L 43/0805 | 709/206 |
| 2015/0230093 A1* | 8/2015 | Park | H04W 72/0453 | 726/4 |
| 2015/0282030 A1* | 10/2015 | Vrind | H04W 76/28 | 370/311 |
| 2015/0365828 A1* | 12/2015 | Saida | H04M 3/00 | 455/411 |
| 2016/0328719 A1* | 11/2016 | Ananchaperumal | H04W 4/70 | |
| 2017/0064006 A1* | 3/2017 | Xue | H04L 67/53 | |
| 2017/0099648 A1* | 4/2017 | Malik | H04W 64/00 | |
| 2017/0150417 A1* | 5/2017 | Baroudi | H04W 40/10 | |
| 2017/0235906 A1* | 8/2017 | Dorris | G16H 20/70 | 705/2 |
| 2017/0236063 A1* | 8/2017 | Dorris | G16H 20/30 | 706/11 |
| 2017/0347387 A1* | 11/2017 | Dunsbergen | H04W 76/15 | |
| 2018/0035289 A1* | 2/2018 | Shulman | H04L 63/08 | |
| 2019/0208470 A1* | 7/2019 | Asterjadhi | H04W 52/0229 | |
| 2019/0258991 A1* | 8/2019 | Nguyen | H04L 9/0894 | |
| 2020/0250530 A1* | 8/2020 | Shen | H04L 41/16 | |
| 2020/0374373 A1* | 11/2020 | Pratt | H04L 69/18 | |
| 2021/0019072 A1* | 1/2021 | Marivoet | G06F 3/0647 | |
| 2021/0081148 A1* | 3/2021 | Xiao | G06F 3/0659 | |
| 2022/0132523 A1* | 4/2022 | Lee | H04W 72/1215 | |
| 2022/0398282 A1* | 12/2022 | Sasikumar | G06F 16/90335 | |
| 2024/0323219 A1* | 9/2024 | Hagh | H04L 63/1433 | |

* cited by examiner

WIRELESS COMMUNICATION DEVICE AND WIRELESS COMMUNICATION METHOD ABLE TO VERIFY VENDOR INFORMATION

BACKGROUND OF THE INVENTION

1. Field of the Invention

The present disclosure relates to a wireless communication system, especially to a wireless communication device and a wireless communication method that are able to exchange vendor information in a packet.

2. Description of Related Art

In general, a wireless communication device is connected to other wireless communication devices via a predetermined communication protocol. In the existing predetermined communication protocol, two devices are required to exchange device information via certain hand-shaking procedures and make the connection in a connection mode defined by the predetermined communication protocol after the device information is verified, in which that device information is typically set in the frame of a media access control (MAC) layer of the packet. In order to improve stability, these devices are usually connected via a common communication protocol, without considering the specificities and application requirements of different devices. For example, certain communication devices may have high power saving requirements. If those devices are connected to other devices using a common protocol (rather than a relatively power-efficient protocol), those devices may not be able to fully meet the power-saving requirements.

SUMMARY OF THE INVENTION

In some aspects, an object of the present disclosure is, but is not limited to, to provide a wireless communication device and a wireless communication method that are able to exchange and verify vendor information.

In some aspects, a wireless communication device includes a transceiver circuit and a processor circuit. The transceiver circuit is configured to receive a packet from an electronic device. The processor circuit is configured to analyze the packet to obtain in a physical layer a data message of the packet and determine whether a vendor of the electronic device is a predetermined vendor according to the data message. If the processor circuit determines that the vendor of the electronic device is the predetermined vendor, the processor circuit is further configured to perform a specific communication mode of the predetermined vendor to connect to the electronic device, and if the processor circuit determines that the vendor of the electronic device is not the predetermined vendor, the processor circuit is further configured to perform a predetermined communication mode of a predetermined communication protocol to connect to the electronic device.

In some aspects, a wireless communication device includes a processor circuit and a transceiver circuit. The processor circuit is configured to add a data message of a first vendor to a frame a packet through a physical layer. The transceiver circuit is configured to transmit the packet to an electronic device, such that the electronic device determines whether the first vendor is a predetermined vendor according to the packet. If the electronic device determines that the first vendor is the predetermined vendor, the processor circuit is further configured to perform a specific communication mode of the predetermined vendor to connect to the electronic device, and if the electronic device determines that the first vendor is not the predetermined vendor, the processor circuit is further configured to perform a predetermined communication mode of a predetermined communication protocol to connect to the electronic device.

In some aspects, a wireless communication method includes the following operations: adding a data message of a vendor of a first wireless communication device to a frame of a packet through a physical layer; transmitting, by the first wireless communication device, the packet to a second wireless communication device; analyzing, by the second wireless communication device, the packet to obtain the data message; determining, by the second wireless communication device, whether both of the vendor of the first wireless communication device and a vendor of the second wireless communication device are a predetermined vendor according to the data message; if both of the vendor of the first wireless communication device and the vendor of the second wireless communication device are the predetermined vendor, performing, by the second wireless communication device, a specific communication mode of the predetermined vendor to connect to the first wireless communication device; and if at least one of the vendor of the first wireless communication device and the vendor of the second wireless communication device is not the predetermined vendor, performing, by the second wireless communication device, a predetermined communication mode of a predetermined communication protocol to connect to the first wireless communication device.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
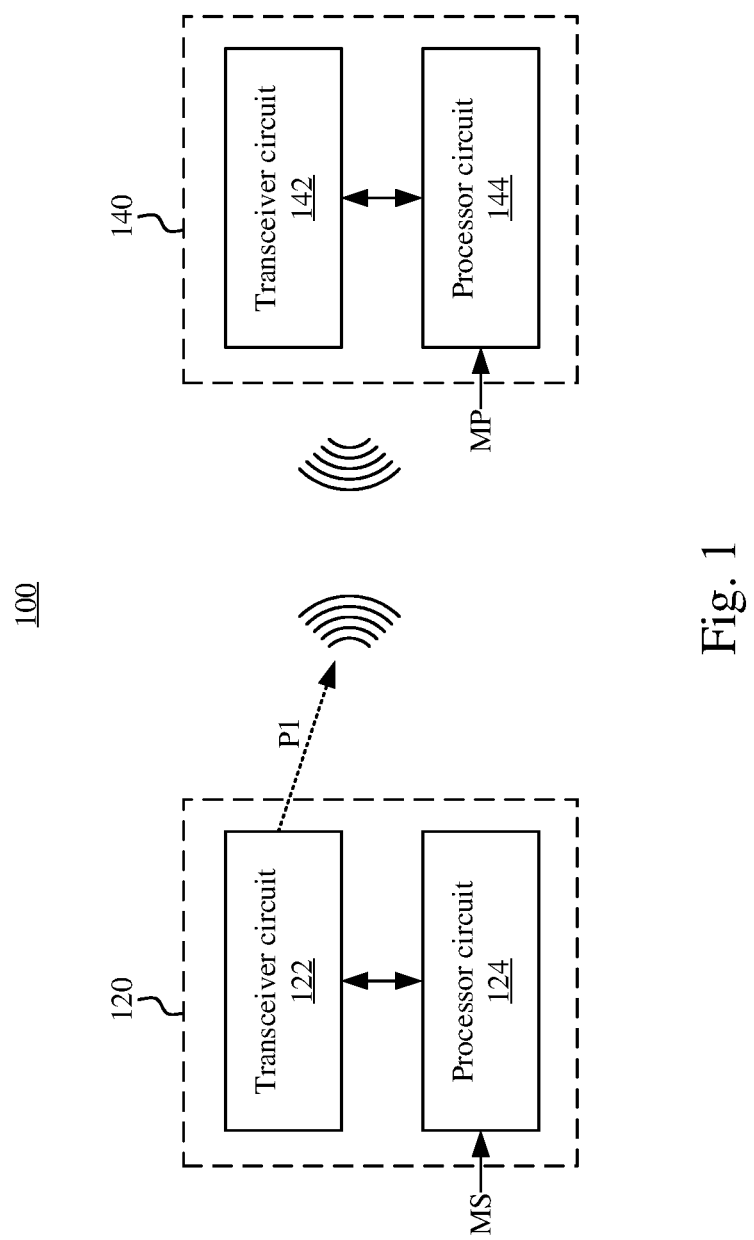
FIG. 1 illustrates a schematic diagram of a wireless communication system according to some embodiments.

FIG. 1 illustrates a schematic diagram of a wireless communication system 100 according to some embodiments. The wireless communication system 100 includes a wireless communication device 120 and a wireless communication device 140. In some embodiments, each of the wireless communication device 120 and the wireless communication device 140 may be an electronic device having wireless communication ability, and the wireless communication device 120 and the wireless communication device 140 may transfer data and/or commands with each other via wireless communication. For example, the wireless communication device 120 may be, but not limited to, a wireless access point, and the wireless communication device 140 may be, but not limited to, a station.

The wireless communication device 120 includes a transceiver circuit 122 and a processor circuit 124. The transceiver circuit 122 may be configured to transmit data (for example, packet P1) and/or command(s) to the wireless communication device 140 or receive data and/or command(s) from the wireless communication device 140. In some embodiments, the transceiver circuit 122 may be a transceiver circuit that supports a predetermined communication protocol. In some embodiments, the predetermined communication protocol may be IEEE 802.11 or its related communication standard (which may be, for example but not limited to, IEEE 802.11b/g/n/ac/ax). The processor circuit 124 may be configured to perform operations in FIG. 2A, in order to connect to the wireless communication device 140. In some embodiments, the processor circuit 124 may be, but not limited to, a digital signal processor circuit in a baseband circuitry of the wireless communication device 120.

Similar to the wireless communication device 120, the wireless communication device 140 includes a transceiver circuit 142 and a processor circuit 144. The transceiver circuit 142 may be configured to transmit data and/or command(s) to the wireless communication device 140 or receive data (e.g., packet P1) and/or commands from the wireless communication device 120. In some embodiments, the transceiver circuit 142 may be a transceiver circuit that supports the aforementioned predetermined communication protocol. The processor circuit 144 may be configured to perform operations in FIG. 2B, in order to connect to the wireless communication device 120. In some embodiments, the processor circuit 144 may be, but not limited to, a digital signal processor circuit of a baseband circuitry in the wireless communication device 140.

In some embodiments, the wireless communication device 120 and the wireless communication device 140 are electronic devices fabricated by the same vendor. In a general case, the wireless communication device 120 (and/or the wireless communication device 140) may be connected to other electronic device(s) via a predetermined communication mode defined in the aforementioned predetermined communication protocol. With operations in FIG. 2A and FIG. 2B, the wireless communication device 140 may determine whether the vendor of the wireless communication device 120 (hereinafter referred to as "first vendor") is the same as the vendor of the wireless communication device 140 (hereinafter referred to as "predetermined vendor") based on the packet P1 from the wireless communication device 120. If the wireless communication device 140 detects that the first vendor is the predetermined vendor, it indicates that the vendor of the wireless communication device 120 is the same as that of the wireless communication device 140. Under this condition, the wireless communication device 120 and the wireless communication device 140 may speed up communication or meet special needs by a specific communication mode or a specific function predefined by the predetermined vendor. For example, if the wireless communication device 120 has a power-saving requirement, the wireless communication device 120 and the wireless communication device 140 may be connected to each other by a relatively power-saving communication mode.

In some embodiments, the specific communication mode may be an improved connection mode based on the predetermined communication protocol, which may utilize specific information that are stored in advance to establish a connection to save time for information exchange and verification to improve the connection efficiency. In some embodiments, the specific communication mode may be an improved connection mode based on the predetermined communication protocol, which may utilize the frequency band(s) with low interoperability in the predetermined communication protocol to establish the connection to improve the connection efficiency. For example, generally speaking, communications devices operating in the 5G band do not use the band corresponding to 802.11b for data exchange. If the wireless communication device 120 and the wireless communication device 140 are operating in the 5G band, the wireless communication device 120 and the wireless communication device 140 may utilize the band corresponding to 802.11b to transmit packet(s) via the specific connection mode on condition that the vendor of the wireless communication device 120 is the same as that of the wireless communication device 140. In some embodiments, the specific communication mode may be a connection mode obtained by adjusting upper rule(s) of the predetermined communication protocol.

The types of the specific communication mode are given for illustrative purposes, and the present disclosure is not limited thereto. In some embodiments, the specific information may be device data, product serial number, communication characteristic(s), and so on of the wireless communication device 120 (and/or the wireless communication device 140). For example, the wireless communication device 140 may include a memory circuit (not shown), which may store the specific information about the wireless communication device 120 in advance. Similarly, the wireless communication device 120 may include a memory circuit (not shown), which may store the specific information about the wireless communication device 140 in advance.

Alternatively, if the wireless communication device 140 detects that the first vendor is not the predetermined vendor, it indicates that the vendor of the wireless communication device 120 is different from that of the wireless communication device 140. Under this condition, the wireless communication device 120 and the wireless communication device 140 may be connected to each other via the predetermined communication mode in the predetermined communication protocol.

Figure 2A:
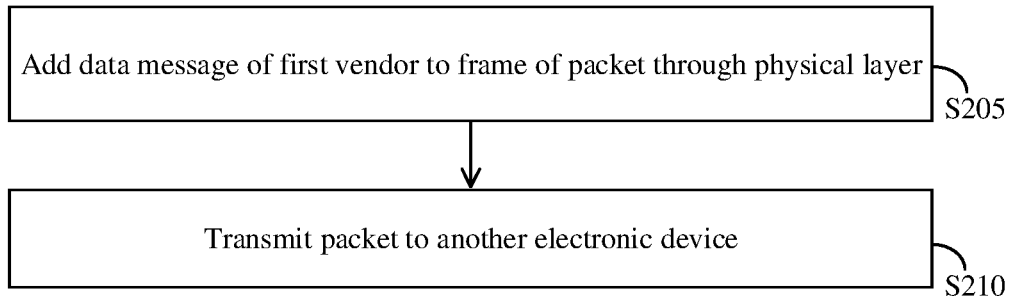
FIG. 2A illustrates a flow chart of operations performed by the wireless communication device in FIG. 1 according to some embodiments of the present disclosure.

FIG. 2A illustrates a flow chart of operations performed by the wireless communication device 120 in FIG. 1 according to some embodiments of the present disclosure. In this example, the wireless communication device 120 operates as a transmitter end. In operation S205, a data message of the first vendor is added to a frame of a packet through a physical layer. In operation S210, the packet is transmitted to another electronic device (which may be, for example, the wireless communication device 140).

For example, as shown in FIG. 1, a data message MS may be stored in a memory circuit (not shown) of the wireless communication device 120 in advance, and the processor circuit 124 may read the memory circuit to obtain the data message MS. In some embodiments, the data message MS is digital information that is sufficient to indicate an identity of the first vendor. For example, the data message MS may be, but not limited to, a digital signature of the first vendor, or data generated by encoding the digital signature. In other embodiments, various information or data that are sufficient to indicate the identity of the first vendor correctly can be utilized to implement the data message MS. In some embodiments, the processor circuit 124 may hide the data message MS in the packet P1. In order to improve the security (and/or confidentiality), the processor circuit 124 may hide the data message MS in the frame in the lowest layer of packet P1.

Taking IEEE 802.11 as an example, the processor circuit 124 may hide the data message MS in the frame of the packet P1 through the physical layer. That frame may include a physical layer convergence procedure (PLCP) header, and the data message MS may be set to be reserved bits in the PLCP header. In greater detail, if the predetermined communication protocol is IEEE 802.11b, the reserved bits may be bits B0-B3 and B3-B6 in the SERVICE field of the PLCP header. Alternatively, if the predetermined communication protocol is IEEE 802.11g/n/ac/x, the reserved bits may be bits B7-B15 in the SERVICE filed of the legacy signal field (L-SIG) of the PLCP header. The processor circuit 124 may set the reserved bits to be the data message MS, in order to add the identity information of the first vendor to the packet P1. Afterwards, the transceiver circuit 122 may transmit the packet P1 to the wireless communication device 140. The types of the frame in the physical layer are given for illustrative purposes, and the present disclosure is not limited thereto. It is understood that, according to different predetermined communication protocols, the frame type of the data message MS can be adjusted correspondingly. The content of the aforementioned PLCP header, SERVICE field, and reserved bits may be understood with reference to the requirements of the current communication standard, and thus the related descriptions are not elaborated here.

Figure 2B:
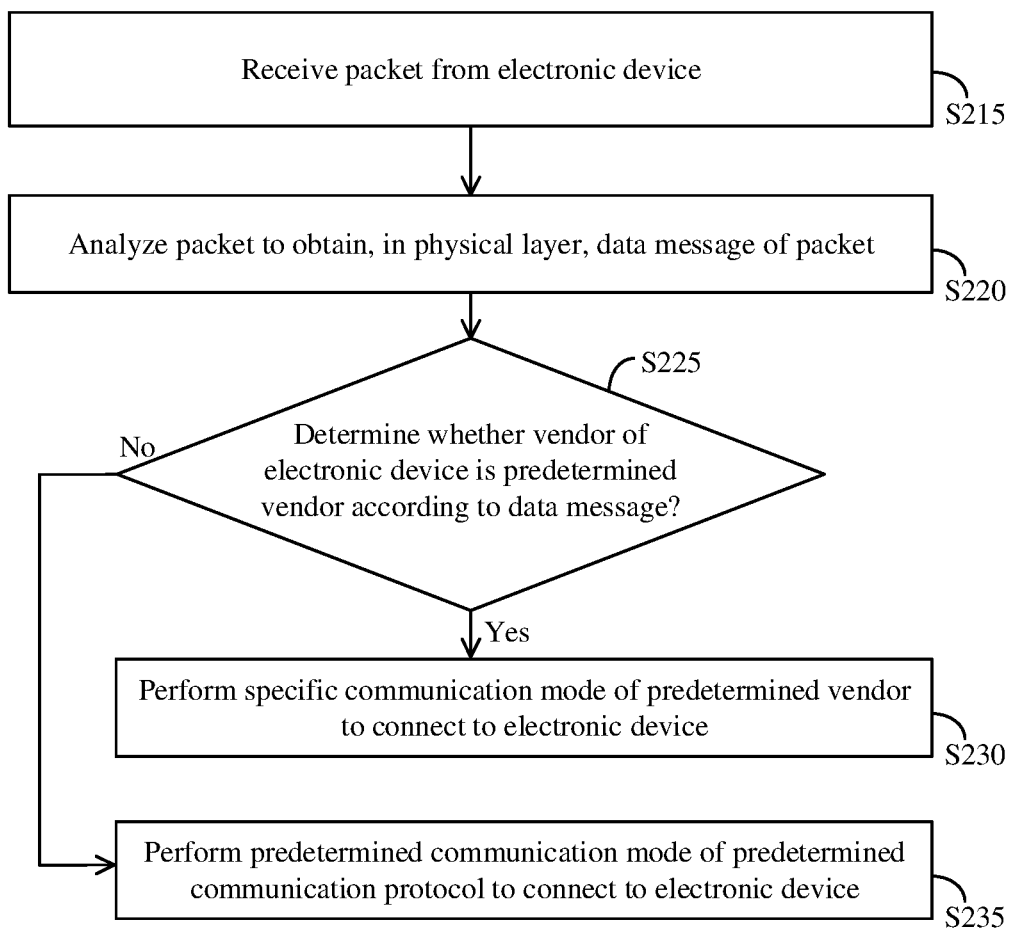
FIG. 2B illustrates a flow chart of operations performed by the wireless communication device in FIG. 1 according to some embodiments of the present disclosure.

FIG. 2B illustrates a flow chart of operations performed by the wireless communication device 140 in FIG. 1 according to some embodiments of the present disclosure. In this example, the wireless communication device 140 operates as a receiver end, which may receive the packet P1 from the wireless communication device 120.

In operation S215, a packet (e.g., the packet P1) is received from an electronic device (e.g., the wireless communication device 120). In operation S220, the packet is analyzed to obtain in the physical layer data message of the packet (e.g., the data message MS). In operation S225, whether the vendor of the electronic device (i.e., the first vendor) is the predetermined vendor according to the data message. If the vendor of the electronic device is the predetermined vendor, operation S230 is performed. Alternatively, if the vendor of the electronic device is not the predetermined vendor, operation S235 is performed. In operation S230, the specific communication mode of the predetermined vendor is performed to connect to the electronic device. In operation S235, the predetermined communication mode of the predetermined communication protocol is performed to connect to the electronic device.

For example, the transceiver circuit 142 may receive the packet P1 from the wireless communication device 120, and the processor circuit 144 may analyze the packet P1 according to data format (or date segment) of the packet P1, in order to obtain in the physical layer the data message MS of the packet P1. For example, the processor circuit 144 may analyze the packet P1 to readout the reserved bits of the PLCP header in the packet P1, in order to obtain the data message MS. Afterwards, the processor circuit 144 may compare the data message MS with a predetermined message MP to determine whether the first vendor is the predetermined vendor. For example, as shown in FIG. 1, the predetermined message MP may be stored in a memory circuit (not shown) of the wireless communication device 140 in advance, and the processor circuit 144 may read the memory circuit to obtain the predetermined message MP, in which the predetermined message MP is digital information that is sufficient to indicate the identity of the vendor the wireless communication device 140 (i.e., the predetermined vendor). For example, the predetermined message MP may be, but not limited to, the digital signature of the predetermined vendor or data generated by encoding the digital signature. In other embodiments, various information or data that are sufficient to indicate the identity of the predetermined vendor can be utilized to implement the predetermined message MP.

If the data message MS is the same as the predetermined message MP, it indicates that both of the first vendor (i.e., the vendor of the wireless communication device 120) and the vendor of the wireless communication device 140 are the predetermined vendor. Under this condition, the processor circuit 144 may perform the specific communication mode to be connected with the wireless communication device 120. For example, the processor circuit 144 may perform the specific communication mode and send a response via the transceiver circuit 142 to notify the wireless communication device 120 that the vendor of both parties is the predetermined vendor, and the processor circuit 124 may perform the specific communication mode based on the response of the wireless communication device 140. As a result, the connection between the wireless communication device 120 and the wireless communication device 140 can be established via the specific communication mode.

Alternatively, if the data message MS is different from the predetermined message MP, it indicates that the first vendor is different from the vendor of the wireless communication device 140. Under this condition, the processor circuit 144 may perform the predetermined communication mode and send a response via the transceiver circuit 142 to notify the wireless communication device 120 that the vendors of both parties are different, and the processor circuit 124 may perform the predetermined communication mode based on the response of the wireless communication device 140. As a result, the connection between the wireless communication device 120 and the wireless communication device 140 may be made via the predetermined communication mode of the predetermined communication protocol.

Figure 3:
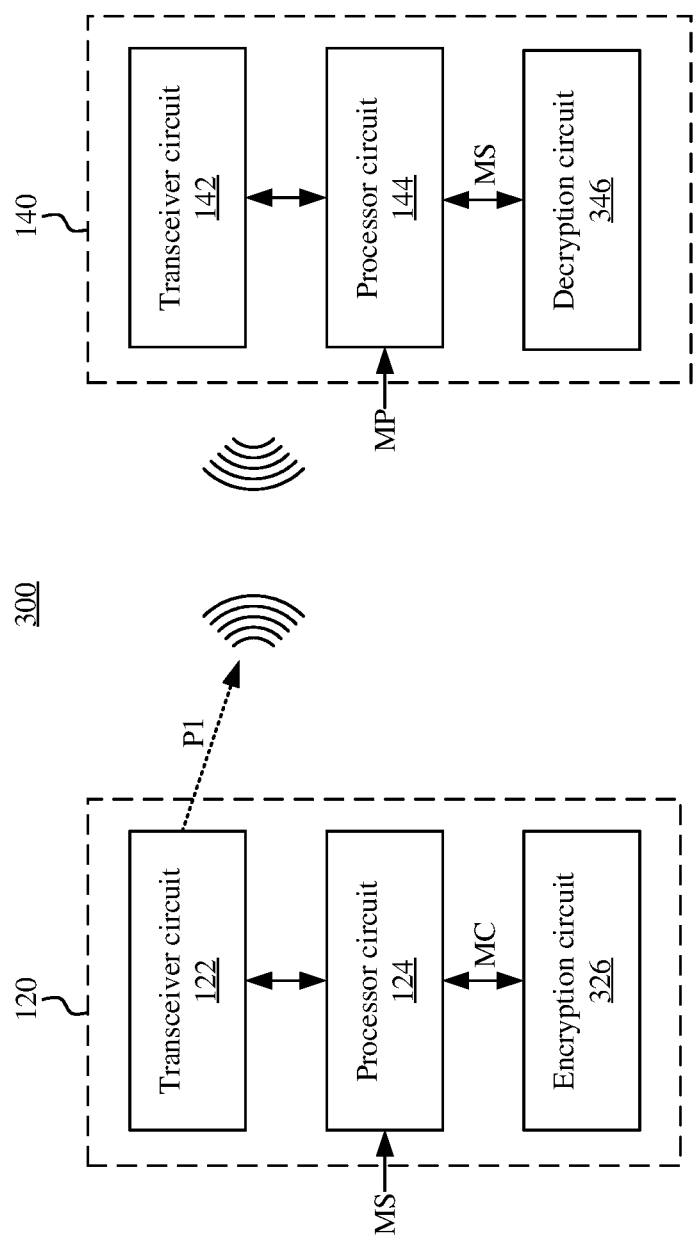
FIG. 3 illustrates a schematic diagram of a wireless communication system according to some embodiments of the present disclosure.

FIG. 3 illustrates a schematic diagram of a wireless communication system 300 according to some embodiments of the present disclosure. Compared with FIG. 1, in this embodiment, the wireless communication device 120 further includes an encryption circuit 326, and the wireless communication device 140 further includes a decryption circuit 346. The encryption circuit 326 is coupled to the transceiver circuit 122 and the processor circuit 124. The encryption circuit 326 may encrypt the data message MS, in order to generate an encrypted message MC. The processor circuit 124 may add the encrypted message MC to the frame of the packet P1 through the physical layer and transmit the packet P1 to the wireless communication device 140 via the transceiver circuit 122.

In some embodiments, the encryption circuit 326 may be a digital signal processing circuit, which may perform a predetermined encryption algorithm according to the data message MS to generate an encrypted message MC. In some embodiments, the predetermined encryption algorithm may be, but not limited to, cyclic redundancy check (CRC) encryption algorithm. In some embodiments, the encryption circuit 326 may be an encoder circuit, which may encode information (which may be, but not limited to, data length, the number of the packet, and so on) associated with the data message MS and the packet P1, in order to generate the encrypted message MC. In some embodiments, the encryption circuit 326 and the processor circuit 124 may be integrated into a single processor circuitry.

Similarly, the decryption circuit 346 is coupled to the transceiver circuit 142 and the processor circuit 144. The decryption circuit 346 may decrypt the packet P1 to obtain the data message MS. Accordingly, the processor circuit 144 may determine whether the vendor of the wireless communication device 120 is the same as that of the wireless communication device 140 according to the data message MS. With the arrangements of the encryption circuit 326 and the decryption circuit 346, the security of the data message MS can be improved, in order to prevent the data message MS from being obtained or tampered by a third party during the transmission progress.

In some embodiments, the decryption circuit 346 may be a digital signal processor circuit, which may perform a predetermined decryption algorithm (which corresponds to the predetermined encryption algorithm) on the encrypted message MC in the packet P1 to obtain the data message MS. In some embodiments, the predetermined decryption algorithm may be, but not limited to, a CRC decryption algorithm. In some embodiments, the encryption circuit 326 may be a decoder circuit, which may decode the encrypted message MC to obtain the data message MS. In some embodiments, the decryption circuit 346 and the processor circuit 144 may be integrated into a single processor circuitry.

The implementations of the encryption circuit 326 and the decryption circuit 346 and the types of the predetermined encryption/decryption algorithm are given for illustrative purposes. Various circuits and/or algorithms able to encrypt and/or decrypt data are within the contemplated scope of the present disclosure.

Figure 4:
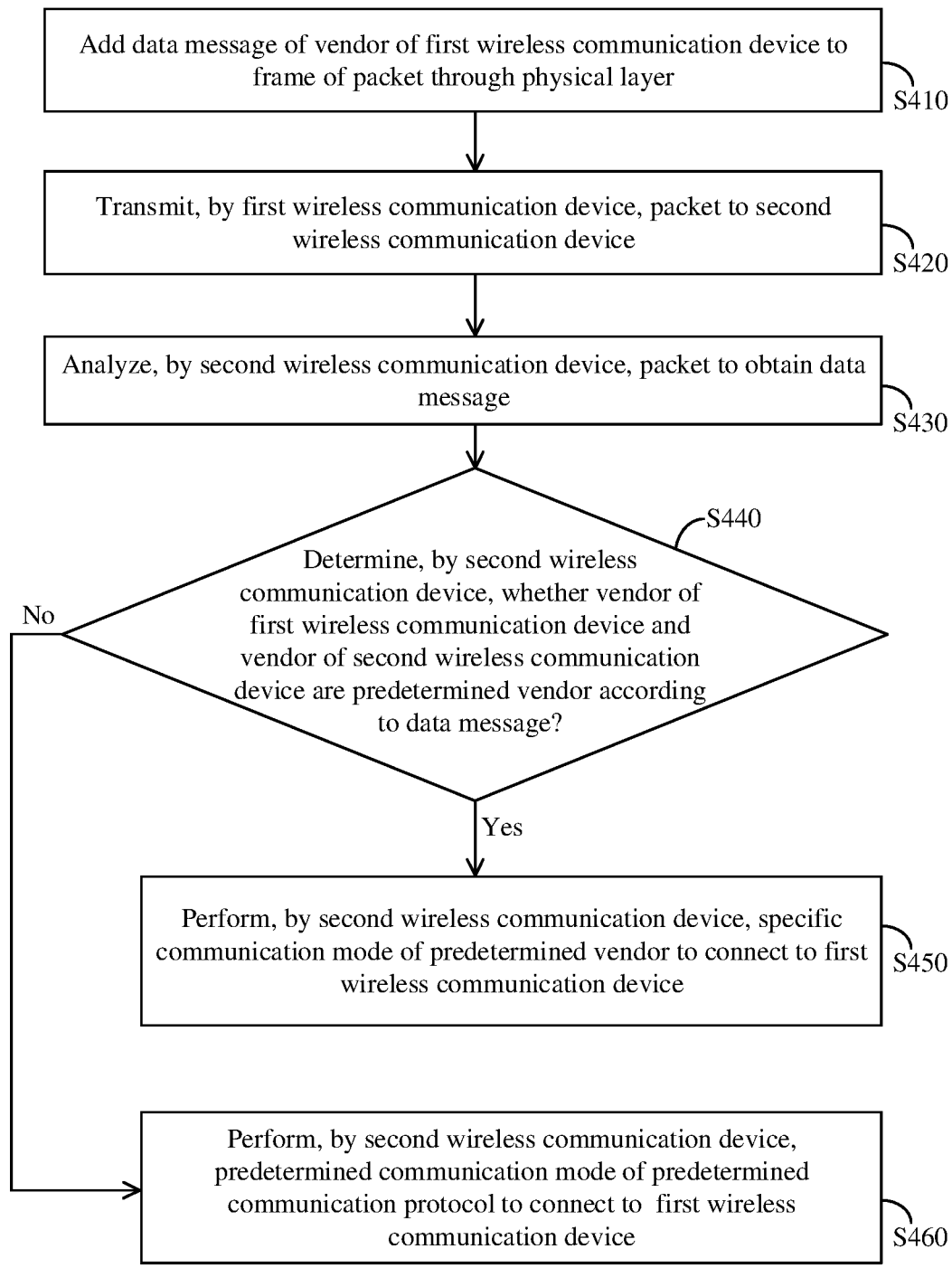
FIG. 4 is a flow chart of a wireless communication method according to some embodiments of the present disclosure.

FIG. 4 is a flow chart of a wireless communication method 400 according to some embodiments of the present disclosure. In some embodiments, the wireless communication method 400 may be, but not limited to, the wireless communication system 100 in FIG. 1 or the wireless communication system 300 in FIG. 3.

In operation S410, data message (e.g., data message MS) of a vendor of a first wireless communication device (e.g., the wireless communication device 120) is added to a frame of a packet (e.g., packet P1) through the physical layer. In operation S420, the packet is transmitted by a first wireless communication device to a second wireless communication device (e.g., the wireless communication device 140). In operation S430, the packet is analyzed by the second wireless communication to obtain the data message. In operation S440, whether the vendor the first wireless communication device and the vendor the second wireless communication device are a predetermined vendor is determined by the second wireless communication device according to the data message. If the vendor of the first wireless communication device and that of the second wireless communication device are the predetermined vendor, operation S450 is performed. Alternatively, if at least one of the vendors of the first and the second wireless communication devices is not the predetermined vendor, operation S460 is performed. In operation S450, a specific communication mode of the predetermined vendor is performed by the second wireless communication device, in order to be connected with the first wireless communication device. In operation S460, the predetermined communication mode of the predetermined communication protocol is performed by the second wireless communication device, in order to be connected with the first wireless communication device.

The operations S410, S420, S430, S440, S450, and S460 can be understood with reference the above embodiment, and thus the repetitious descriptions are not further given. The above description of FIG. 2A, FIG. 2B, and/or FIG. 4 may include exemplary operations, but the operations shown in FIG. 2A, FIG. 2B, and/or FIG. 4 are not necessarily performed in the order described above. Operations shown in FIG. 2A, FIG. 2B, and/or FIG. 4 can be added, replaced, changed order, and/or eliminated, or the operations shown in FIG. 2A, FIG. 2B, and/or FIG. 4 can be executed simultaneously or partially simultaneously as appropriate, in accordance with the spirit and scope of various embodiments of the present disclosure. For example, operations of encryption and decryption in embodiments of FIG. 3 can be added to the wireless communication method 400 to improve data security.

As described above, the wireless communication device and the wireless communication method in some embodiments of the present disclosure may hide related information of the device vendor in the packet to verify whether the vendor of the transmitter end is the same as that of the receiver end, in order to selectively perform a specific communication mode (which is different from the predetermined communication mode of the predetermined communication protocol), in order to improve the connection efficiency or meet the special needs.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A wireless communication method, comprising:
   adding a data message of a vendor of a first wireless communication device to a frame of a packet through a physical layer;
   transmitting, by the first wireless communication device, the packet to a second wireless communication device;
   analyzing, by the second wireless communication device, the packet to obtain the data message;
   determining, by the second wireless communication device, whether both of the vendor of the first wireless communication device and a vendor of the second wireless communication device are a predetermined vendor according to the data message;
   if both of the vendor of the first wireless communication device and the vendor of the second wireless communication device are the predetermined vendor, performing, by the second wireless communication device, a specific communication mode of the predetermined vendor to connect to the first wireless communication device; and
   if at least one of the vendor of the first wireless communication device and the vendor of the second wireless communication device is not the predetermined vendor, performing, by the second wireless communication device, a predetermined communication mode of a predetermined communication protocol to connect to the first wireless communication device.

2. The wireless communication method of claim 1, further comprising:
   encrypting, by the first wireless communication device, the data message to generate an encrypted data message,
   wherein the first wireless communication device is further configured to add the encrypted data message to the frame of the packet through the physical layer.

3. The wireless communication method of claim 2, wherein encrypting, by the first wireless communication device, the data message to generate the encrypted data message comprises:
   performing a cyclic redundancy check encryption algorithm according to the data message to generate the encrypted data message.

4. The wireless communication method of claim 1, further comprising:
   performing, by the second wireless communication device, a decryption according to the packet to obtain the data message.

5. The wireless communication method of claim 4, wherein performing, by the second wireless communication device, the decryption according to the packet to obtain the data message comprises:
   performing a cyclic redundancy check decryption algorithm according to the packet to obtain the data message.

6. The wireless communication method of claim 1, wherein determining, by the second wireless communication device, whether both of the vendor of the first wireless communication device and the vendor of the second wireless communication device are the predetermined vendor according to the data message comprises:
   comparing the data message with a predetermined message to determine whether both of the vendor of the first wireless communication device and the vendor of the second wireless communication device are the predetermined vendor are the predetermined vendor.

7. The wireless communication method of claim 6, further comprising:
   if the data message is the same as the predetermined message, determining that both of the vendor of the first wireless communication device and the vendor of the second wireless communication device are the predetermined vendor; and
   if the data message is different from the predetermined message, determining that at least one of the vendor of the first wireless communication device and the vendor of the second wireless communication device is not the predetermined vendor.

8. A wireless communication system, comprising:
   a first wireless communication device configured to add a data message of a vendor of the first wireless communication device to a frame of a packet through a physical layer; and
   a second wireless communication device,
   wherein the first wireless communication device is further configured to transmit the packet to the second wireless communication device, and the second wireless communication device is configured to:
   analyze the packet to obtain the data message;
   determine whether both of the vendor of the first wireless communication device and a vendor of the second wireless communication device are a predetermined vendor according to the data message;
   perform a specific communication mode of the predetermined vendor to connect to the first wireless communication device if both of the vendor of the first wireless communication device and the vendor of the second wireless communication device are the predetermined vendor; and
   perform a predetermined communication mode of a predetermined communication protocol to connect to the first wireless communication device if at least one of the vendor of the first wireless communication device and the vendor of the second wireless communication device is not the predetermined vendor.

9. The wireless communication system of claim 8, wherein the first wireless communication device is further configured to encrypt the data message to generate an encrypted data message, and add the encrypted data message to the frame of the packet through the physical layer.

10. The wireless communication system of claim 9, wherein the first wireless communication device is configured to perform a cyclic redundancy check encryption algorithm according to the data message to generate the encrypted data message.

11. The wireless communication system of claim 8, wherein the second wireless communication device is further configured to perform a decryption according to the packet to obtain the data message.

12. The wireless communication system of claim 11, wherein the second wireless communication device is configured to perform a cyclic redundancy check decryption algorithm according to the packet to obtain the data message.

13. The wireless communication system of claim 8, wherein the second wireless communication device is configured to compare the data message with a predetermined message to determine whether both of the vendor of the first wireless communication device and the vendor of the second wireless communication device are the predetermined vendor.

14. The wireless communication system of claim 13, wherein the second wireless communication device is further configured to determine that both of the vendor of the first wireless communication device and the vendor of the second wireless communication device are the predetermined vendor if the data message is the same as the predetermined message, and determine that at least one of the vendor of the first wireless communication device and the vendor of the second wireless communication device is not the predetermined vendor if the data message is different from the predetermined message.

\* \* \* \* \*